United States Patent [19]

Housand

[11] Patent Number: 4,457,722
[45] Date of Patent: Jul. 3, 1984

[54] EDUCATIONAL TOY FOR DEVELOPING MANUAL DEXTERITY

[76] Inventor: Nancy C. Housand, 630 S. Kenton St., Urbana, Ohio 43078

[21] Appl. No.: 522,075

[22] Filed: Aug. 11, 1983

[51] Int. Cl.³ ............................................. G09B 19/24
[52] U.S. Cl. ................................................... 434/260
[58] Field of Search ......................... 434/258, 259, 260

[56] References Cited

U.S. PATENT DOCUMENTS

| | | | |
|---|---|---|---|
| 2,623,303 | 12/1952 | Mindel | 434/259 |
| 2,774,150 | 12/1956 | Genin | 434/259 |
| 2,835,986 | 5/1958 | Roeder | 434/260 |
| 2,972,820 | 2/1961 | Cano | 434/260 |
| 3,427,731 | 2/1969 | Debolt | 434/260 |
| 3,538,620 | 11/1970 | Kohner et al. | 434/258 |
| 3,546,788 | 12/1970 | Drumm | 434/260 |
| 4,083,123 | 4/1978 | Livermore | 434/260 X |

FOREIGN PATENT DOCUMENTS

| | | | |
|---|---|---|---|
| 909152 | 10/1962 | United Kingdom | 434/260 |
| 1109819 | 4/1968 | United Kingdom | 434/259 |

*Primary Examiner*—William H. Grieb
*Attorney, Agent, or Firm*—Biebel, French & Nauman

[57] ABSTRACT

An educational toy having a substantially rectangular and planar base, a plurality of locks attached to a common side of the base and capable of adjustment to a locked or to an unlocked configuration, a plurality of fasteners adjustably mounted on the base, a tool for adjusting the fasteners, a knob threaded onto a bolt attached to the base, a pair of doors pivotally attached to the base and to at least one of the lock members such that the attached lock member can be adjusted to lock the doors in a closed configuration, and an image mounted on the base and positioned such that it is covered by the doors when in the closed configuration. The tool and all of the lock and fastener components are either attached to or tethered to the base so that the components cannot be lost.

11 Claims, 4 Drawing Figures

EDUCATIONAL TOY FOR DEVELOPING MANUAL DEXTERITY

BACKGROUND OF THE INVENTION

This invention relates to educational toys and, more particularly, to toys for developing the manual dexterity of children.

There are many types of educational toys for children whose primary benefit is to develop the manual dexterity of the user. A common and well-known example of this type of toy comprises a box or other type of container having a plurality of openings formed on its sides, each opening having a different shape and communicating with its interior. This toy includes a plurality of smaller pieces, each having a specific shape corresponding to one of the openings such that it is capable of passing through only that corresponding opening. The manual dexterity of the child user is developed since the child must orient each piece properly in order to insert it through its associated opening.

For example, Genin U.S. Pat. No. 2,774,150 discloses an educational toy comprising a box-like container having a plurality of openings in an upper surface, each having a distinct shape, and a plurality of blocks, each having a profile in section corresponding to the shape of one of the openings. Beneath each opening is a cam which can be rotated by a key to lower or elevate an associated block when in that opening. Each keyhole has a different slot profile so that only a key having that profile can be inserted to turn the cam behind the keyhole.

Another type of dexterity developing toy is disclosed in Mindel U.S. Pat. No. 2,623,303. That patent discloses a box-like container having a compartmented interior, and an opening of a different shape communicating with each of the interior compartments. Each of the compartments also includes a door through which the contents of the interior may be removed, and each door has a different type of latching mechanism.

A problem often associated with these types of dexterity developing toys is that the toy includes a plurality of loose pieces which are not only easily lost but can greatly increase the time required to clean up the toy for storage. Another disadvantage with such toys is that the type of manual dexterity developed has little practical application, since it is rarely required of a child to place an eccentrically shaped object into a container through an opening having a shape which matches that eccentric shape. However, the user of the toy disclosed in the aforementioned Mindel patent can develop some practical skills in operating the latches on the doors, but such skills are apparently of a secondary nature in the use of the toy so that a child would use that component relatively infrequently.

Accordingly, there is a need for an educational toy for developing the manual dexterity of the child user which does not require the use of a plurality of loose pieces. In addition, such a toy should be directed to developing manual dexterity and skills of a practical nature.

SUMMARY OF THE INVENTION

The present invention is an educational toy which comprises a substantially planar base, a plurality of locks attached to a common side of the base and capable of adjustment to a locked or an unlocked configuration, a plurality of fasteners adjustably mounted on the base, a tool for adjusting the fasteners, a knob removably threaded onto the base, a door pivotally attached to the base and to at least one of the locks so that it can be locked in a closed configuration, and an image mounted on the base beneath the door so that the image may be viewed when the door is opened. In a preferred embodiment, a variety of well-known locks are used which are relatively inexpensive and available from a number of sources.

For example, the toy may include locks such as a sliding bolt, hook and eyelet, hasp and staple, and the like. In manipulating these well-known types of locks, the child user develops manual skills of a practical nature so that the child user can learn to open doors and containers in his environment having similar types of locks. Similarly, the fasteners are of a common nature, such as hex-headed bolts, and the tool is of a well-known type, such as an adjustable wrench, so that the child user can gain practical experience in using tools which he can apply to or at least identify in his environment. Manipulation of the knob develops motor skills which facilitate the child's learning to unscrew a cap to ajar or to turn a doorknob. The knob also preferably resembles its counterpart in the environment of the child user. Another advantage of using such well-known components is that children, who often eagerly mimic the behavior of nearby adults, will be compelled to operate the locks and use the tool on the fasteners after having seen an adult do the same with a similar lock or fastener.

Another feature of the preferred embodiment is that the doors are shaped to resemble barn doors, and the image is of a barn scene. The child user is thus taught to associate the barn scene with that type of door construction.

The tool, knob, and loose pieces of the locks are tethered to the base by lightweight chains, so there are no loose pieces which are separable from the base. This greatly reduces the time required to clean up the toy for storage, and virtually eliminates the possibility of losing the components of the toy.

Accordingly, it is an object of the present invention to provide an educational toy which develops the manual dexterity of the child user; a toy which does not include a plurality of loose pieces which are easily lost and can increase the time required to clean up the toy for storage; a toy in which the child user learns manual skills of a practical nature; and an educational toy which can be made from well-known and easily available parts so that the manufacturing costs are minimized.

Other objects and advantages of the invention will be apparent from the following description, the accompanying drawings and the appended claims.

DETAILED DESCRIPTION OF THE PREFERRED EMBODIMENT

Figure 1:
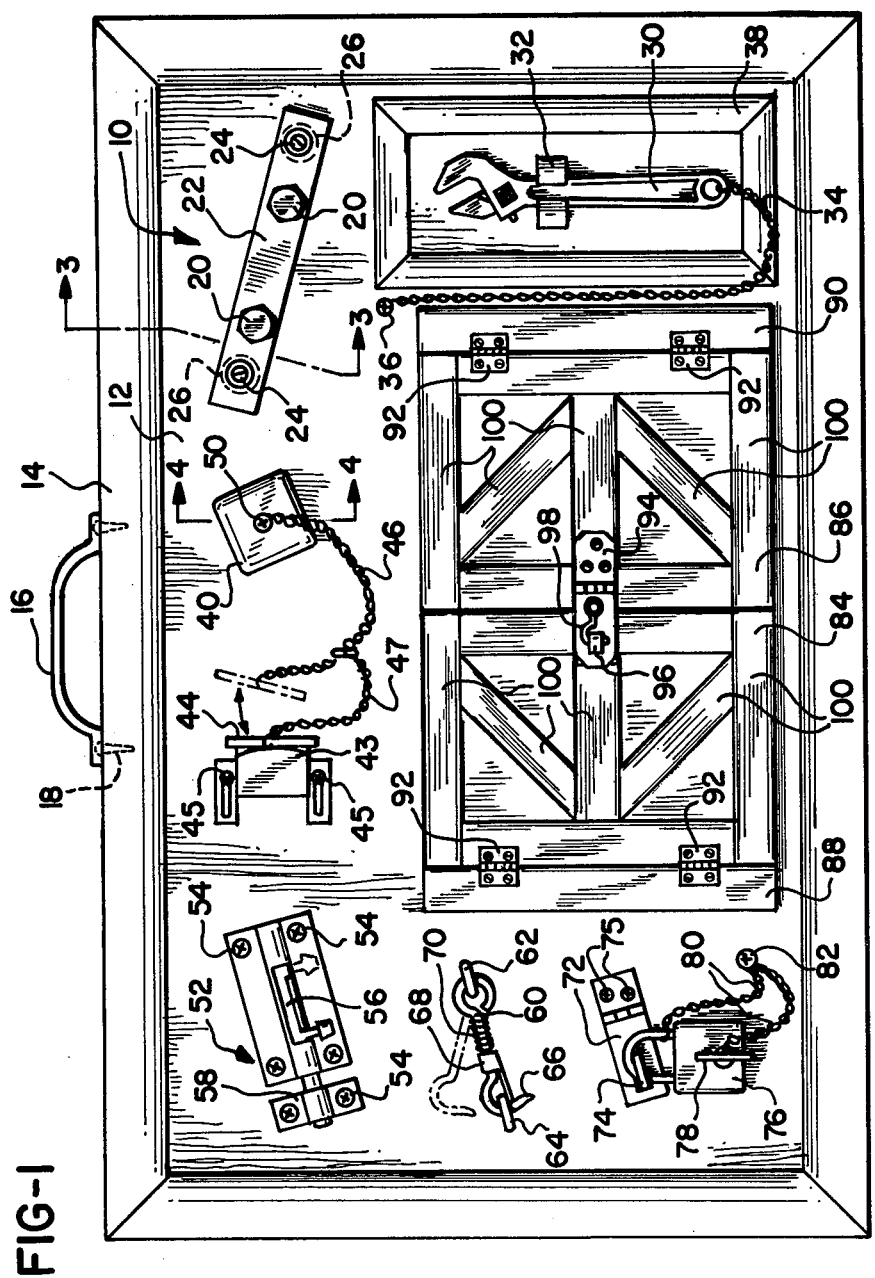
FIG. 1 is a front elevation of a preferred embodiment of the educational toy of the present invention.
Figure 2:
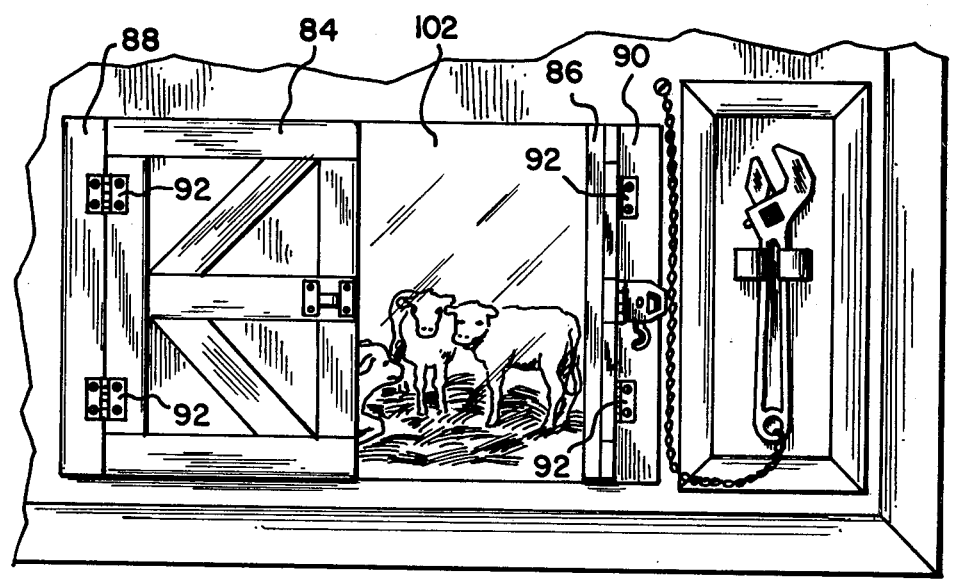
FIG. 2 is a detail of the embodiment of FIG. 1 showing the image located beneath the doors.
Figure 3:
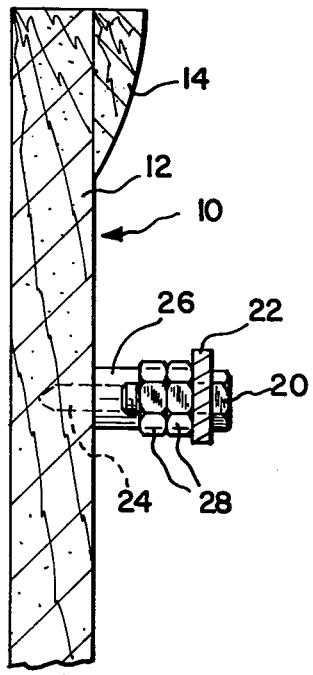
FIG. 3 is a detail of a side section taken at line 3—3 of FIG. 1 and showing a fastener.

As shown in FIGS. 1 and 3, the educational toy of the present invention includes a base 10, which consists of a planar, rectangular board 12 and a raised border 14. The base 10 includes a carrying handle 16 which is attached by screws 18 to the border 14. Although the base 10 is shown in the figures as being made of wood, it can be made of any other suitable material, such as plastic, without departing from the scope of the invention.

A pair of fasteners in the form of hex-headed bolts 20 are attached to a bar 22 which is mounted on the board 12. The bar 22 is attached to the board 12 by screws 24 which are driven into the board and extend through cylindrical spacers 26, so that the bar 22 is spaced from the board. The bolts 20 are secured to the bar 22 by pairs of nuts 28 which are tightened against each other to prevent their removal from the shank of the bolts 20. The nuts 28 are threaded onto the bolts 20 such that the bolts may be rotated easily relative to the bar 22.

An adjustable wrench 30 is positioned immediately below the bar 22 and is held for storage by a resilient clip 32 of a well-known design. The wrench 30 is tethered to the board 12 by a chain 34 which is attached to the board by a screw 36. The wrench 30 is enclosed by a raised frame 38. Other types of tools, such as a box wrench, open end wrench, pliers, or combinations of these may be used and not depart from the scope of the invention.

Figure 4:
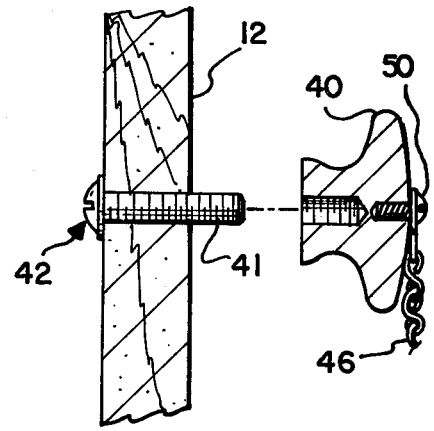
FIG. 4 is a detail of a side section taken at line 4—4 of FIG. 1 and showing a knob removed from its mounting bolt.

As shown in FIGS. 1 and 4, a knob 40 is removably threaded onto the shank 41 of a bolt 42 fixed to the base 10 adjacent to the bar 22. The bolt 42 is threaded into the base 10 such that the shank 41 protrudes from the board 12. A lock consisting of a magnet 43 and ferromagnetic plate 44 is positioned adjacent to the knob 40. The magnet 43 and plate 44 are of the type commonly used in securing hinged cabinet doors and the like. The magnet 43 is attached to the board 12 by screws 45, and the plate 44 is attached to one end of a chain 46. The chain 46 is attached to the board 12 by a screw 47 at its midportion and to the knob 40 by a screw 50 at its opposite end.

A sliding bolt type lock 52 is positioned in the upper left-hand corner of the board 12 and is attached to the board by screws 54. The sliding bolt lock 52 includes a bolt 56 which can be displaced to engage or disengage a loop 58 which forms a part of the lock.

A lock in the form of a hook is positioned immediately below the sliding bolt 52 and includes a hook 60 pivotally attached to the board 12 by an eyelet 62 and an eyelet 64 which is positioned to be engaged by the tongue 66 of the hook 60. The hook 60 is of a well-known design and includes a catch 68 which is biased against the tongue 66 by a spring 70.

A lock comprising a hasp 72 and staple 74 is attached to the board 12 immediately below the hook by screws 75, and includes a padlock 76 which secures the hasp to the staple, and a key 78 for unlocking padlock 76. The padlock and key are secured to the board 12 by chains 80 which are attached to the board by a screw 82.

Doors 84, 86 are attached to jambs 88, 90 by hinges 92 so that they open and close toward a point midway between the jambs. The jambs 88, 90 are, in turn, secured to the base by nails (not shown). The doors are secured in a closed position, in which they overlay the board 12, by a lock comprising a hasp and staple 94, 96. The hasp includes a hook 98, pivotally attached thereto, which is positioned to engage the staple 96 to secure the lock. In this embodiment, the doors 84, 86 include struts 100 suggestive of barn doors, and enclose an image 102, which is preferably a photograph of a typical barn scene, such as farm animals.

The manual dexterity of a child user is developed as the child locks and unlocks each of the locks, uses the wrench 30 to rotate the bolts 20, and unscrews and screws the knob 40 to the bolt 42. As mentioned previously, each of the locks is of a type of which is commonly used, thereby giving the child practical experience in manipulating these types of locking devices. The wrench 30 and bolts 20 provide the child user with valuable experience in learning the use of tools.

The combination of the hasp and staple 94, 96 with the doors 84, 86 gives the child user a practical example of how a lock is used to secure hinged doors in a closed configuration. In addition, the child learns to associate doors 84, 86 having this particular appearance with an appropriate image 102.

While the form of apparatus herein described constitutes a preferred embodiment of this invention, it is to be understood that the invention is not limited to this precise form of apparatus, and that changes may be made therein without departing from the scope of the invention.

What is claimed is:

1. An educational toy comprising:
    a board-like base,
    a plurality of conventional locks mounted on said base in a manner permitting locking and unlocking manipulation of the components thereof,
    a plurality of conventional fasteners mounted on said base,
    a plurality of tools engagable with said fasteners to permit fastening and unfastening manipulation of said fasteners by said tools, means for connecting said tools to said base,
    door means,
    hinge means attaching said door means to said base while permitting pivoting movement of said door means between a closed position overlying said base and opened positions projecting outwardly from said base, and
    at least one of said conventional locks being operable to secure said door means in said closed position thereof.

2. An educational toy comprising:
    a substantially planar base;
    a plurality of locks attached to a common side of said base and capable of adjustment to a locked or an unlocked configuration;
    a plurality of fasteners adjustably mounted on said side of said base;
    tool means for adjusting said fasteners;
    door means pivotally attached to said side of said base and attached to at least one of said locks such that said attached lock can be adjusted to lock said door means in a closed configuration whereby said door means overlies said base; and
    an image mounted on said side of said base and positioned such that it is covered by said door means when in said closed configuration.

3. The toy of claim 2 further comprising a knob tethered to said base and a threaded shank protruding from said common side, said knob removably threaded to said shank.

4. The toy of claim 3 wherein said tool means is tethered to said base.

5. The toy of claim 4 wherein said fasteners include a bar spaced from said side of said base; and bolts having heads thereon engagable by said tool means, said bolts rotatably attached to but not removable from said bar.

6. The toy of claim 5 wherein said locks include a magnet attached to said base; and a ferromagnetic plate tethered to said base such that said plate may be engaged with or disengaged from said magnet.

7. The toy of claim 5 wherein said locks include a sliding bolt.

8. The toy of claim 5 wherein said locks include a hook and eyelet.

9. The toy of claim 5 wherein said locks include a hasp and staple, a padlock for engaging said staple, and a key for unlocking said padlock; said padlock and key tethered to said side of said base.

10. The toy of claim 5 wherein said door means includes a pair of doors, hinges attaching said doors to said base, and said one of said lock members includes a hasp attached to one of said panels and including a pin pivotally attached thereto, and a staple attached to the other of said panels to be engaged by said pin and said hasp, such that said panels may be locked in said closed configuration.

11. An educational toy comprising:
a substantially planar and rectangular base;
a plurality of locks attached to a common side of said base and capable of adjustment to a locked or an unlocked configuration, said locks including a magnet attached to said base and a ferromagnetic plate tethered to said base such that said plate may be engaged with or disengaged from said magnet, a sliding bolt, a hook and eyelet, a hasp and staple, a padlock for engaging said staple, and a key for unlocking said padlock, said padlock and key tethered to said side of said base;
a fastener assembly mounted on said side of said base, said fastener assembly including a bar attached to and spaced from said side of said base, hex-headed bolts extending through said bar, and pairs of nuts threaded onto said bolts to retain them on said bar for relative rotational movement;
tool means including an adjustable wrench releasably mounted on said side of said base and tethered thereto, for engaging and rotating said bolts;
a knob tethered to said side and a threaded shank protruding from said base, said knob removably threaded to said shank.
a pair of doors;
a pair of jambs attached to said side of said base and to said doors by hinges such that said doors pivotally open and close toward a point midway between said jambs, a lock including a hasp attached to one of said doors and a staple attached to the other of said doors, said hasp having a hook for securing said hasp to said staple when said doors are in a closed configuration overlying said base; and
an image located between said base and said doors such that it is observable when said doors are in an open configuration, extending outwardly from said base.

* * * * *